United States Patent
Takanashi et al.

(10) Patent No.: US 6,415,658 B1
(45) Date of Patent: Jul. 9, 2002

(54) WEAR DETECTION PROBE FOR A BRAKE ELEMENT

(75) Inventors: Hitoshi Takanashi; Takehiro Matsunaga, both of Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/453,895

(22) Filed: Mar. 24, 2000

(30) Foreign Application Priority Data

Apr. 2, 1999 (JP) .......................................... 11-096856

(51) Int. Cl.$^7$ ............................................... F16D 66/02
(52) U.S. Cl. ........................................ 73/121; 340/453
(58) Field of Search ................................. 340/453, 454; 73/121, 131

(56) References Cited

U.S. PATENT DOCUMENTS

| | | | | |
|---|---|---|---|---|
| 3,986,164 A | * | 10/1976 | Hirai et al. ............... | 340/52 A |
| 4,016,533 A | * | 4/1977 | Ishikawa et al. ........... | 340/52 A |
| 4,183,012 A | * | 1/1980 | Kimura ...................... | 340/52 A |
| 4,742,326 A | * | 5/1988 | Gregoire et al. ........... | 340/52 A |
| 4,869,350 A | * | 9/1989 | Fargier et al. .............. | 340/454 |
| 5,454,450 A | * | 10/1995 | Tanigawa ...................... | 73/129 |
| 5,833,033 A | | 11/1998 | Takanashi .................... | 340/454 |
| 6,065,359 A | * | 5/2000 | Takanashi et al. ............ | 73/129 |
| 6,158,275 A | * | 12/2000 | Asao et al. .................... | 73/121 |

FOREIGN PATENT DOCUMENTS

| | | |
|---|---|---|
| DE | 4120527 | 1/1992 |
| EP | 0610828 | 8/1994 |
| EP | 0814276 | 12/1997 |
| JP | 10-2363 | 1/1998 |

* cited by examiner

*Primary Examiner*—G Dombroske
(74) *Attorney, Agent, or Firm*—Greenblum & Bernstein, P.L.C.

(57) ABSTRACT

The present invention is directed to a wear detection probe in which the deflection of a folded portion of an electric detection wire is suppressed so as to be able to cut the folded portion of the wire in a secure position. A truncated cone is formed at the edge part of a retention member, and a groove extending in a diametric direction is cut at the edge part. A supporting protrusion is formed by traversing the groove, and the electric detection wire is retained in a position in which the folded portion is securely mounted on the supporting protrusion which extends from both openings from which the electric wire extends. The wire is sandwiched by both side walls of the groove and the side walls operate as regulating walls so that when the folded portion of the electric wire begins to be exposed and contacts a brake drum, the folded portion will not be pulled out by a deflecting force in a sidewards direction. The deflection is suppressed by the regulating walls, and the folded portion is retained in a secure position on the supporting protrusion. The folded portion is therefore gradually cut in a secure mode.

4 Claims, 4 Drawing Sheets

WEAR DETECTION PROBE FOR A BRAKE ELEMENT

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Background Information

A previously proposed probe is capable of cutting a wear detecting electric wire without damaging a retention member, even when the retention member is arranged in a slightly slanted position against an opposing rotor (Japanese Patent Publication (Unexamined) Hei No. 10-2363). As shown in FIG. 6 of the present application, the probe includes an electric wire 2 folded in a U-shape and received in a retention member 1 so that folded portion 3 is exposed from an edge face 1A of the retention member. A half-cylindrical supporting protrusion 4 is installed on edge face 1A to support folded portion 3 of electric wire 2 in a strained condition in which folded portion 3 is mounted on supporting protrusion 4. According to this structure, since folded portion 3 of electric wire 2 is supported at a position in which it protrudes from edge face 1A, edge face 1A approaches a position in which it is separated from the rotor even if retention member 1 is arranged in a slightly slanted position against the rotor, and therefore folded portion 3 can be cut without damage.

However, a problem has been discovered in the above-mentioned structure. For example, when the probe of the above-mentioned structure is assembled in a brake shoe and arranged in confrontation with a brake drum which rotates in the direction of arrow A in FIG. 6, as the wear of the brake shoe continues and folded portion 3 of electric wire 2 contacts the brake drum, folded portion 3 is drawn out from supporting protrusion 4 by a friction force, and then folded portion 3 is elastically deformed in a position in which it is forcibly laid down on supporting protrusion 4 while being deflected in a direction as shown by arrow B of FIG. 6.

It is feared that when folded portion 3 of the electric wire 2 is in this position, the timing of the cut may be changed in comparison with the position in which it is securely mounted on the supporting protrusion 4, and the accuracy of the wear detection of the brake shoe is lessened.

2. Field of the Invention

The present invention relates to a probe for wear detection of a brake element and for indicating when replacement of the brake element is required.

SUMMARY OF THE INVENTION

The present invention is accomplished based on the above-mentioned circumstances, and an object is to be able to cut the folded portion in a secure position by suppressing the deflection of the folded portion of an electric detection wire.

To attain this object, the present invention includes a wear detection probe which is assembled in a brake element and is capable of contacting a brake drum or rotor to detect whether the degree of wear of the brake element has reached its useful limit by the presence of a disconnection of the electric detection wire. The probe is equipped with a retention member in which the electric detection wire is inserted and is folded in a U-shape. A supporting protrusion which extends along the central direction of the edge face is formed on the edge face of the retention member and an inner peripheral side of the folded portion protrudes from the edge face of the retention member and is supported by the mounting of the U-shape folded portion on the supporting protrusion. Regulating walls sandwich the folded portion at the supporting protrusion and limit the deflection of the folded portion.

As the U-shape folded portion of the electric detection wire begins to contact an opposing brake drum or rotor, deflection is limited by the regulating walls even if a deflecting force acts in a direction along the supporting protrusion, and the folded portion of the electric detection wire is retained in a condition in which it is firmly mounted on the supporting protrusion. Accordingly, the folded portion is in a condition in which it is gradually cut as it is firmly held, and the circuit is disconnected. Therefore, the wear of the brake piece can be detected with high accuracy.

According to an aspect of the invention the wear detection probe includes a retention member having an edge face and a supporting protrusion extending along a diametric direction of the edge face. An electric detection wire includes a U-shaped folded portion, with an inner peripheral side of said folded portion protruding from the edge face and extending over and being supported by a top face of the supporting protrusion. The retention member includes first and second opposed regulating walls, with the folded portion of the electric detection wire passing between the first and second regulating walls, thereby limiting deflection of the folded portion, whereby the electric detection wire is adapted to actuate a wear indicator when the folded portion is cut and the electric detection wire is no longer continuous.

The wear detection probe further includes a groove formed in the edge face of the retention member, and the supporting protrusion extends along a bottom face of the groove. The supporting protrusion has a semicircular cross-section.

The edge face of retention member may be formed as a truncated cone having a top face. The top face of the supporting protrusion is in the same plane as the top face of the truncated cone.

The wear detection probe of the present invention may be installed in a brake shoe of a drum brake or a brake pad of a disc brake.

BRIEF DESCRIPTION OF THE DRAWINGS

The present invention is further described in the detailed description which follows, with reference to the drawings by way of non-limiting examples of the preferred embodiment, in which like reference numerals represent similar parts throughout the drawings, and wherein.

DETAILED DESCRIPTION OF THE PREFERRED EMBODIMENTS

An embodiment of the present invention is illustrated in FIGS. 1–5 and described below. In this embodiment, the probe of the present invention is applied to a drum brake of an automobile.

Figure 1:
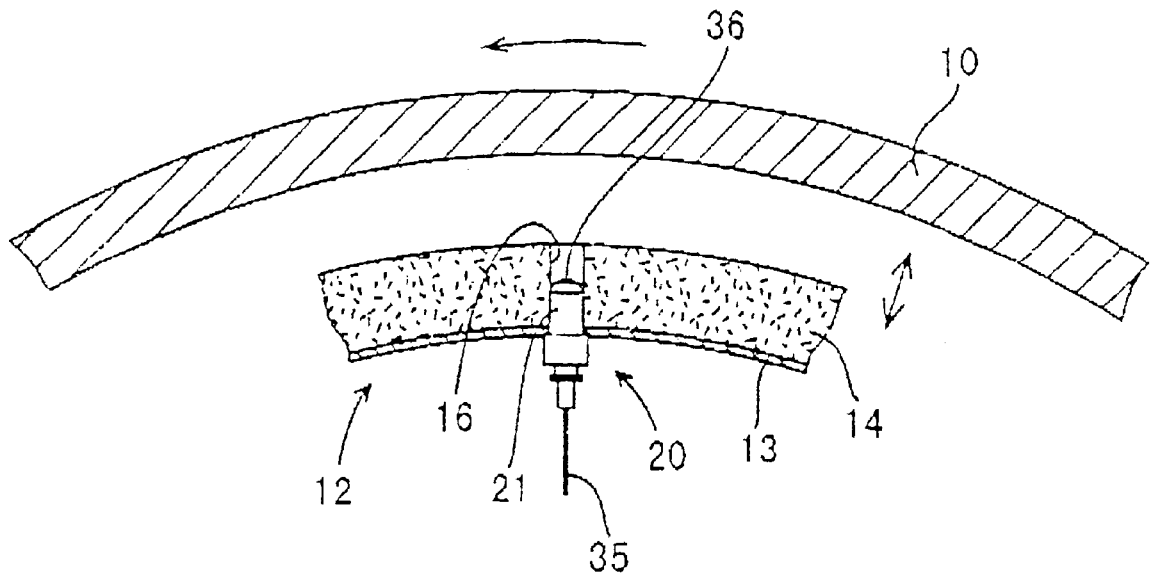
FIG. 1 is a cross-sectional view showing the assembly of the wear detection probe according to one embodiment of the present invention.

In FIG. 1, a cylindrical brake drum 10 rotates together with a wheel. A pair of brake shoes 12 include friction material 14 adhered on base plate 13 and are installed in symmetrical positions at the inside of brake drum 10. Braking occurs by expanding both brake shoes 12 by a not illustrated hydraulic system or the like to push the brake shoes toward the inner face of brake drum 10. One shoe 12 is equipped with an installation hole 16, and the wear detection probe 20 is assembled in the installation hole 16 in a position in which the edge of the probe faces the brake drum 10.

Figure 2:
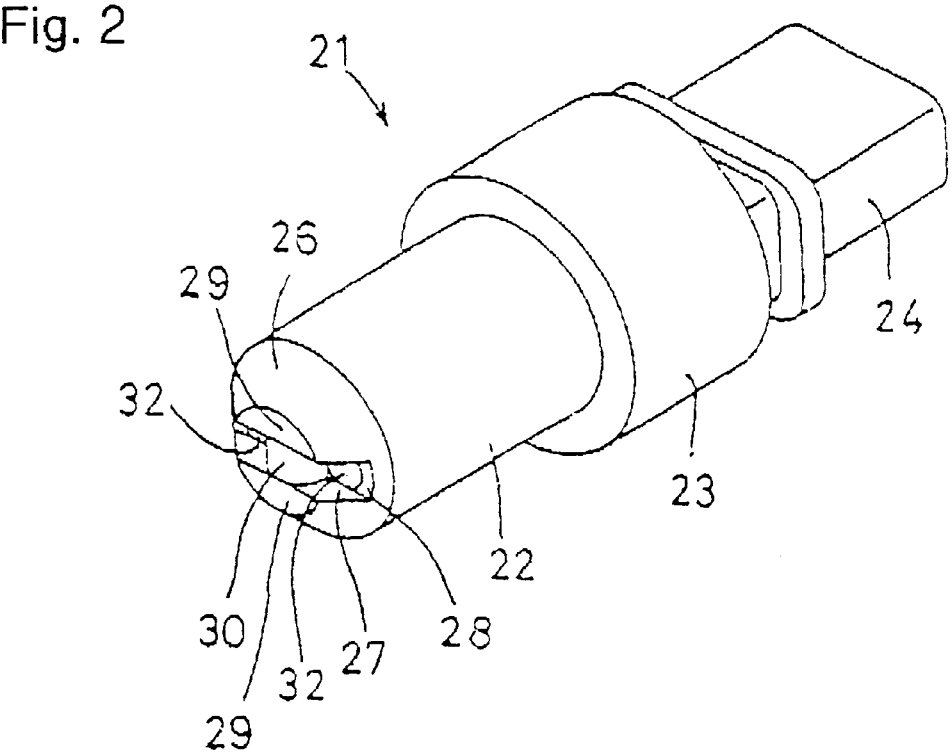
FIG. 2 is a perspective view of the retention member.
Figure 3:
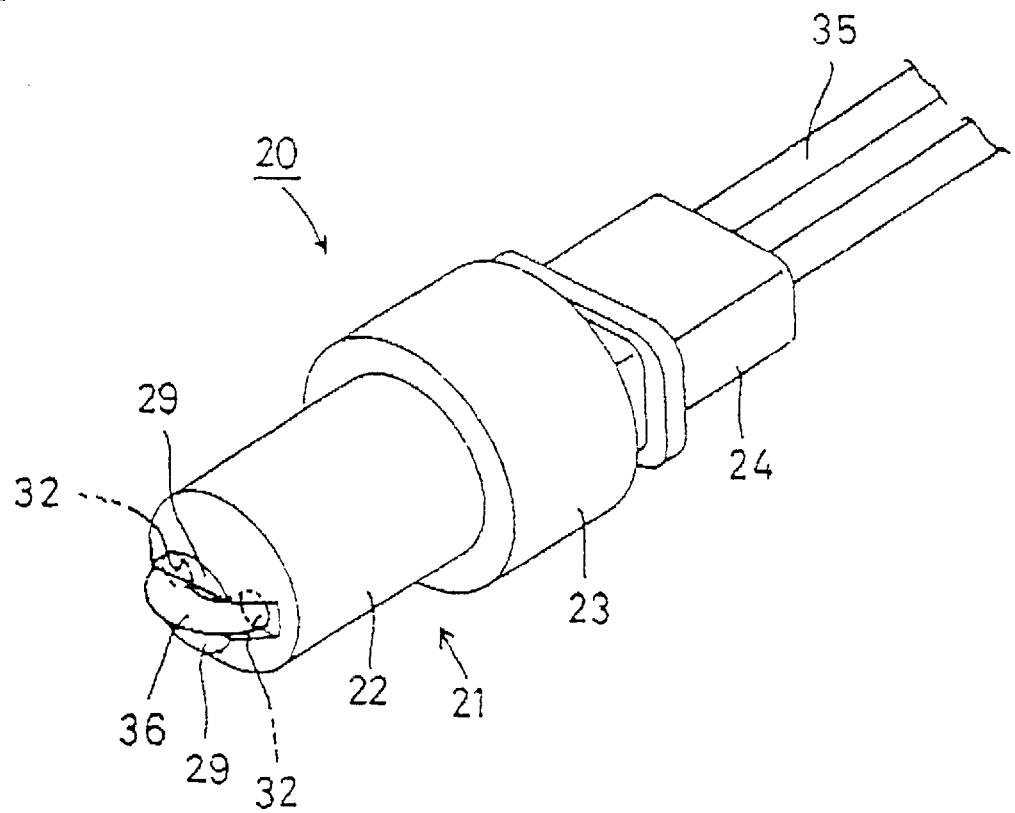
FIG. 3 is a perspective view of the wear detection probe in a position in which an electric wire is assembled.
Figure 4:
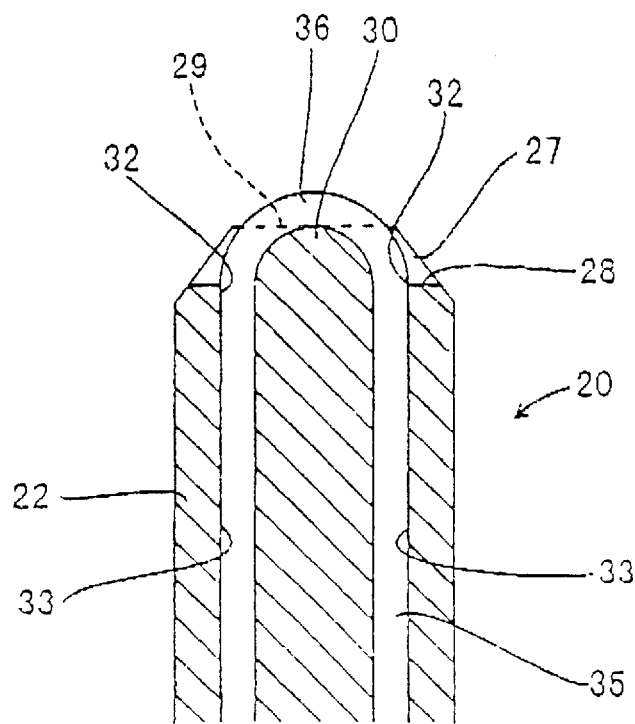
FIG. 4 is a cross-sectional view of the edge side of the wear detection probe.

The structure of the wear detection probe 20 is described below. The probe 20 is constructed so that the electric detection wire 35 is retained in retention member 21, which is made of a synthetic resin. As shown in FIG. 2, retention member 21 has a columnar base part 22. A contact part 23 having a larger diameter than base part 22 is formed at the rear side (the interior side in FIG. 2), and a square protrusion 24 is formed at the rear of contact part 23.

The edge of base part 22 is formed as a truncated cone 26, and a groove 27 having a fixed width extends through the center in a diametric direction in truncated cone 26. Bottom face 28 of groove 27 corresponds to an edge face of retention member 21. Supporting protrusion 30, which is semicircular in cross-section, is transversely formed at the central part along the longitudinal direction of bottom face 28 of groove 27, and the protruding face of supporting protrusion 30 is in the same plane as the top face of truncated cone 26. A pair of openings 32 are formed at both sides of supporting protrusion 30 in bottom face 28, and penetration holes 33 for receiving electric wire 35 extend from both openings 32 to the rear face of square protrusion 24 in parallel with an axis of the probe (see FIG. 4).

Electric wire 35 passes through both penetration holes 33 as described below. First, one end of electric wire 35 is passed through one of the penetration holes 33 at square protrusion 24, and pulled out from one opening 32. Then, electric wire 35 is inserted in another opening 32 by being folded in a U-shape 36, and pulled out again from the rear face of square protrusion 24 through another penetration hole 33. In this case, the wire is strained so that the inner peripheral side of the folded or U-shape portion 36 may be in contact with supporting protrusion 30.

Folded portion 36 is retained at an elevated position above bottom face 28 of groove 27 by the height of supporting protrusion 30. The portion of the wire protruding from both openings 32 becomes sandwiched by both side walls of groove 27, and both the side walls correspond to regulating walls 29 of the present invention.

As shown in FIG. 1, probe 20 is inserted in installation hole 16 of brake shoe 12 and fixed on base plate 13. The edge of probe 20 is pulled in the inside of installation hole 16 by a fixed dimension, and folded portion 36 of electric wire 35 extends in the direction of the rotation of brake drum 10. Further, both terminals of electric wire 35, which are pulled out from the rear face of square protrusion 24 are connected to a disconnection-detection system (not illustrated) and when electric wire 35 is cut, a warning light or other indicating device is designed to be switched on.

The operation of the present invention is described below. When a pedal is depressed, braking occurs by expanding brake shoes 12 and pushing friction material 14 against the inner face of brake drum 10. When such braking operation is repeated, friction material 14 of brake shoes 12 is gradually worn by the friction from brake drum 10. When the degree of wear becomes large, wear detection probe 20, which is installed in friction material 14, becomes gradually exposed, and folded portion 36 of electric wire 35, which is supported by supporting protrusion 30 begins to be worn in a similar manner as friction material 14. Then, when friction material 14 of brake shoe 12 is worn to a use limitation position, electric wire 35 is cut at folded portion 36. The disconnection is detected by the disconnection-detection part, and a warning lamp informing the driver of the use limitation position and need for replacement is lighted.

Figure 5:
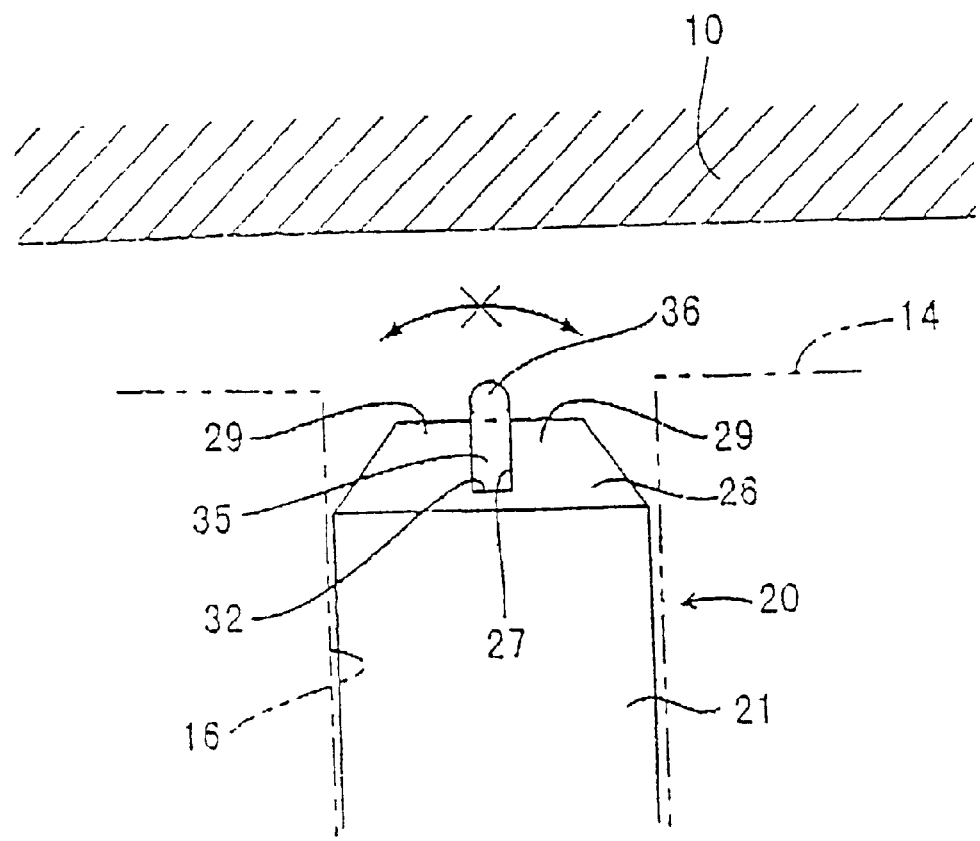
FIG. 5 is a view showing a cutting motion of the electric wire.
Figure 6:
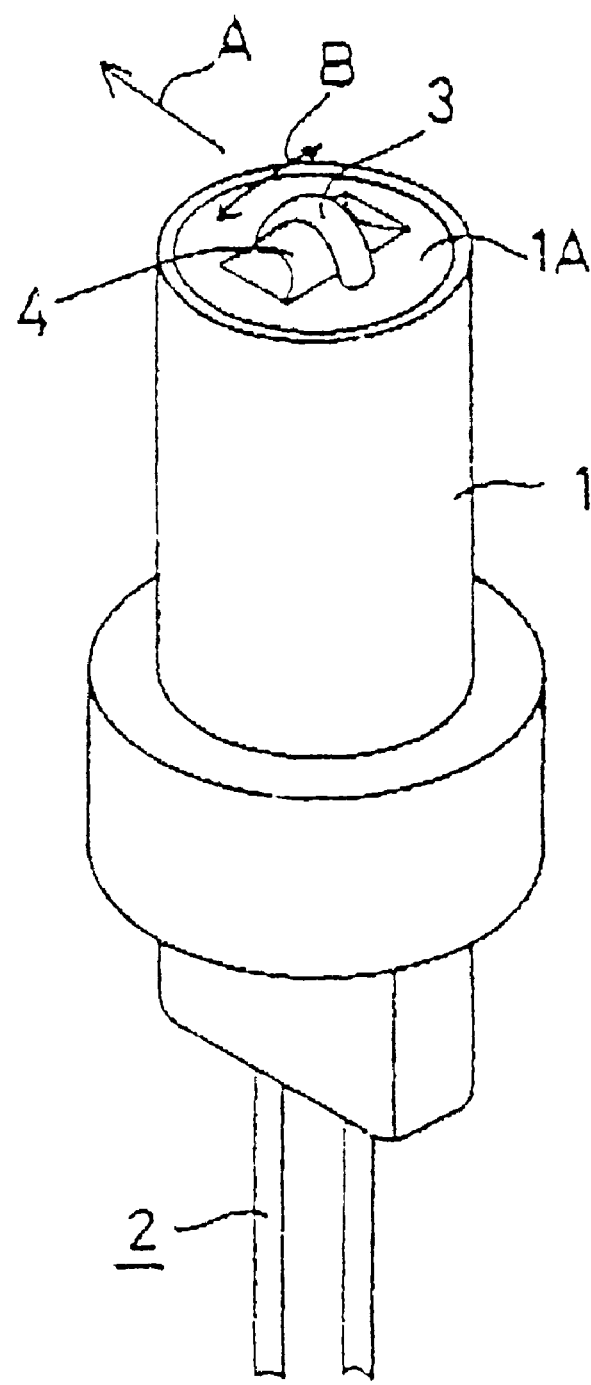
FIG. 6 is a cross-sectional view of a conventional probe.

During the time when folded portion 36 of electric wire 35 begins to be exposed and comes into contact with brake drum 10, there is a fear that folded portion 36 may be pulled out by a friction force and will "float" from the supporting protrusion 30. A force acting in a sidewards direction as shown by the arrow of FIG. 5 acts on folded portion 36. However, according to the present invention, as regulating walls 29 are positioned on both sides of folded portion 36, such deflection is prevented, and folded portion 36 is retained in a position in which it is mounted securely on supporting protrusion 30. Accordingly, folding portion 36 is in a position in which it is gradually cut in a secure position, and is finally disconnected.

As described above and according to the present invention, since the deflection of folded portion 36 is prevented by positioning regulating walls 29 on both sides to sandwich folded portion 36, and folded portion 36 is retained in a secure position on supporting protrusion 30, folded portion 36 is gradually cut in a secure mode of operation to be disconnected. Therefore, the wear of brake shoe 12 can be accurately detected. Furthermore, this result can be accompanied by a simple structure of positioning regulating walls 29 on both sides of the supporting protrusion 30.

The present invention is not limited to the embodiment illustrated according to the above-mentioned description and drawings, and for example, an embodiment in which the regulating walls may be formed in a separate body and secured at a later time is also included in the technical scope of the present invention. Furthermore, the present invention can be carried out by variously changing other elements within the scope of the invention.

the present invention can also be applied to the general wear detection probes used for a disc brake and a brake device having a form of stopping a rotation by other friction operations, in addition to the drum brake exemplified in the above-mentioned embodiment.

The present disclosure relates to subject matter contained in Japanese Patent Application No. 11-096856, filed on Apr. 2, 1999, the contents of which are expressly incorporated by reference herein in its entirety.

What is claim is:

1. A wear detection probe of a brake element said brake element adapted to contact a brake surface, said wear detection probe comprising:

a retention member having an edge face, a supporting protrusion extending along a diametric direction of said edge face, and said supporting protrusion has a semi-circular cross-section and includes a top face, said top face of said supporting protrusion being in the same plane as said edge face of said retention member;

an electric detection wire having a U-shaped folded portion, an inner peripheral side of said folded portion protruding from said edge face and extending over and being supported by said top face of said supporting protrusion; and said retention member comprising a groove formed in said edge face of said retention member forming first and second opposed regulating walls, said supporting projection extending along a bottom face of said groove, and said folded portion of said electric detection wire passing between said first and second regulating walls, thereby limiting deflection of said folded portion;

whereby said electric detection wire is adapted to actuate a wear indicator when said folded portion is cut and said electric detection wire is no longer continuous.

2. The wear detection probe according to claim 1, wherein said edge face of said retention member is foamed as a truncated cone.

3. The wear detection probe according to claim 1, further comprising a groove formed in said edge face of said retention member, said supporting protrusion extending along a bottom face of said groove.

4. The wear detection probe according to claim 1, said wear detection probe being installed in a brake pad of a disc brake.

* * * * *

UNITED STATES PATENT AND TRADEMARK OFFICE
CERTIFICATE OF CORRECTION

PATENT NO.     : 6,415,658 B1
DATED          : July 9, 2002
INVENTOR(S)    : H. Takanashi et al.

It is certified that error appears in the above-identified patent and that said Letters Patent is hereby corrected as shown below:

<u>Column 6,</u>
Line 5, "foamed" should be -- formed --.
Lines 7-10, delete claim 3 in its entirety and insert the following:

-- The wear detection probe according to claim 1, said wear detection probe being installed in a brake shoe of a drum brake --.

Signed and Sealed this

Fifteenth Day of April, 2003

JAMES E. ROGAN
*Director of the United States Patent and Trademark Office*